(12) United States Patent
Amslinger et al.

(10) Patent No.: US 9,962,664 B2
(45) Date of Patent: May 8, 2018

(54) METHOD FOR RECOVERING PROCESS WASTEWATER FROM A STEAM POWER PLANT

(71) Applicant: SIEMENS AKTIENGESELLSCHAFT, München (DE)

(72) Inventors: Ute Amslinger, Auhausen (DE); Franziska Fleischmann, Nürnberg (DE); Wolfgang Glück, Erlangen (DE); Marc Sattelberger, Nürnberg (DE); Werner Spies, Mühlhausen (DE); Anke Söllner, Bubenreuth (DE); Peter Widmann, Dormitz (DE)

(73) Assignee: SIEMENS AKTIENGESELLSCHAFT (DE)

( * ) Notice: Subject to any disclaimer, the term of this patent is extended or adjusted under 35 U.S.C. 154(b) by 466 days.

(21) Appl. No.: 14/430,680

(22) PCT Filed: Sep. 16, 2013

(86) PCT No.: PCT/EP2013/069095
§ 371 (c)(1),
(2) Date: Mar. 24, 2015

(87) PCT Pub. No.: WO2014/048779
PCT Pub. Date: Apr. 3, 2014

(65) Prior Publication Data
US 2015/0251144 A1 Sep. 10, 2015

(30) Foreign Application Priority Data

Sep. 28, 2012 (DE) ........................ 10 2012 217 717

(51) Int. Cl.
*C02F 1/42* (2006.01)
*B01F 3/08* (2006.01)
(Continued)

(52) U.S. Cl.
CPC ............ *B01F 3/0803* (2013.01); *B01F 3/088* (2013.01); *B01F 15/06* (2013.01); *C02F 1/048* (2013.01);
(Continued)

(58) Field of Classification Search
CPC .. C02F 1/048; C02F 1/42; F01K 13/00; F01K 19/00; F22B 37/48; F22D 11/006
(Continued)

(56) References Cited

U.S. PATENT DOCUMENTS 4,353,213 A 10/1982 Masuda et al.
4,430,962 A 2/1984 Miszak
(Continued)

FOREIGN PATENT DOCUMENTS

CN 1926381 A 3/2007
CN 101065559 A 10/2007
(Continued)

OTHER PUBLICATIONS

Fthenakis V. et al; "Life-cycle uses of water in U.S. electricity generation"; Renewable and sustainable Energy Reviews, Elseviers Science, New York, NY; vol. 14; No. 7; pp. 2039-2048; ISSN: 1364-2048; DOI: 10.1016/J.RSER.2010.03.008; XP027068800; 2010; US; Sep. 1, 2010.
(Continued)

*Primary Examiner* — Mark Halpern
(74) *Attorney, Agent, or Firm* — Schmeiser Olsen & Watts LLP

(57) ABSTRACT

A method for operating a steam power plant having a water-steam circuit, according to which method the process wastewater produced is collected from the water-steam circuit, in a separated manner according to the degree of contamination thereof, in a number of partial wastewater quantities is provided. At least a first partial wastewater
(Continued)

Figure 1:
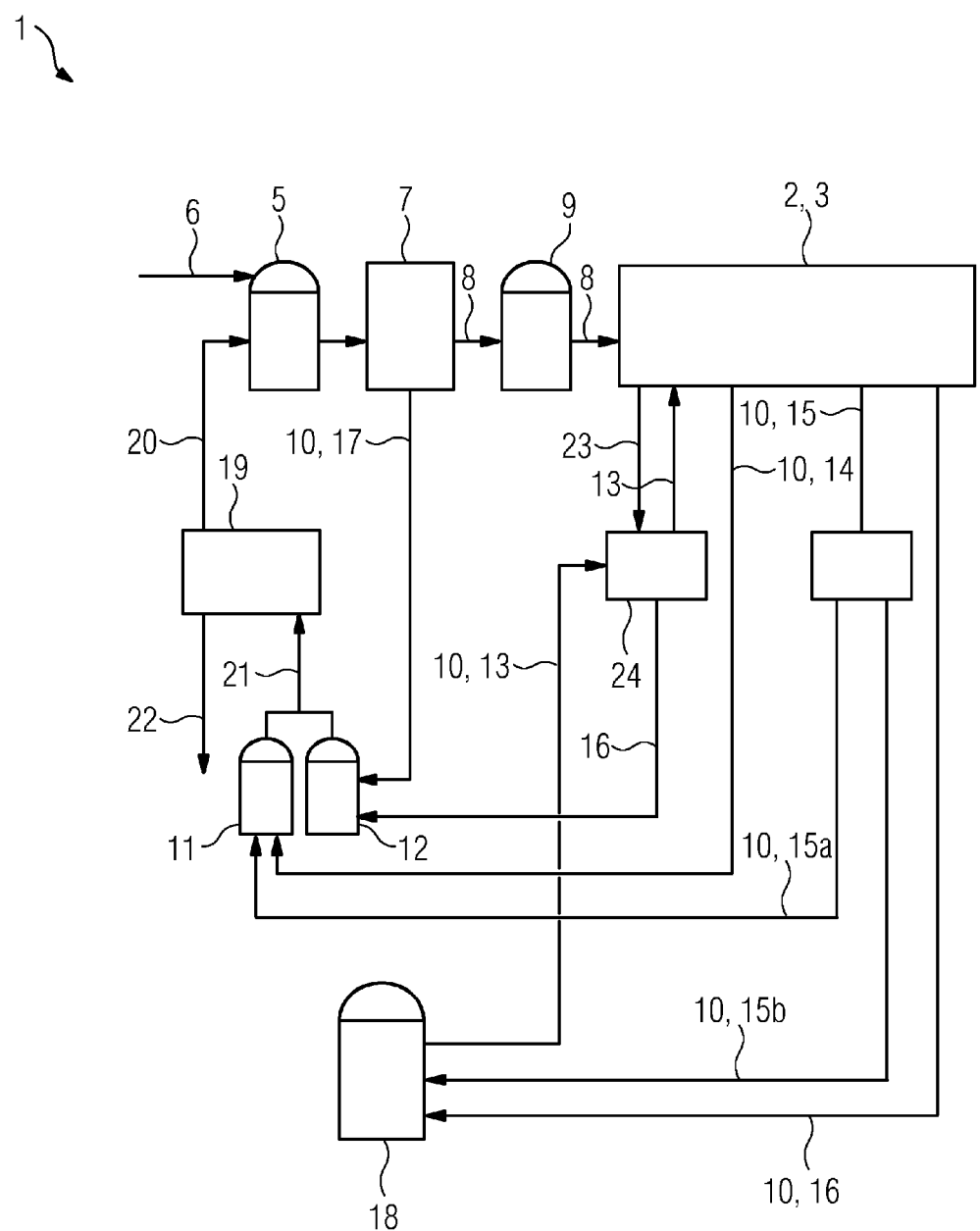

quantity having a first degree of contamination and at least a second partial wastewater quantity having a second degree of contamination are formed in the process. The second degree of contamination is higher than the first degree of contamination. The first partial wastewater quantity and the second partial wastewater quantity are mixed together in such a manner that a combined process wastewater is produced, which is fed to a wastewater treatment plant.

8 Claims, 2 Drawing Sheets

(51) Int. Cl.
*C02F 1/04* (2006.01)
*F01K 13/00* (2006.01)
*F01K 19/00* (2006.01)
*F22B 37/48* (2006.01)
*F22D 11/00* (2006.01)
*B01F 15/06* (2006.01)

(52) U.S. Cl.
CPC .............. *C02F 1/42* (2013.01); *F01K 13/00* (2013.01); *F01K 19/00* (2013.01); *F22B 37/48* (2013.01); *F22D 11/006* (2013.01); *B01F 2003/0884* (2013.01); *B01F 2015/062* (2013.01); *C02F 2209/05* (2013.01); *Y02W 10/37* (2015.05)

(58) Field of Classification Search
USPC .................................................. 366/144, 348
See application file for complete search history.

(56) References Cited

U.S. PATENT DOCUMENTS 5,271,215 A    12/1993  Guillet

2007/0289304 A1    12/2007  Schottler et al.
2007/0289926 A1    12/2007  Schottler et al.
2008/0104959 A1*    5/2008  Schottler .............. F01K 23/106
                                                                60/645

FOREIGN PATENT DOCUMENTS

| DE | 422862 C | 12/1925 |
| DE | 1058072 B | 5/1959 |
| DE | 3031454 A1 | 3/1981 |
| EP | 0054601 A1 | 6/1982 |
| EP | 1662096 A1 | 5/2006 |
| EP | 1706188 A1 | 10/2006 |
| EP | 1806533 A1 | 7/2007 |
| EP | 1706188 B1 | 2/2008 |
| WO | WO 2005068905 A1 | 7/2005 |
| WO | WO 2012066490 A1 | 5/2012 |

OTHER PUBLICATIONS

Hitzel H. et al; "Kondensatreinung mit seperaten Kationen- und Anionenaustauschern für das direkt luftgekühlte Kraftwerk Matimba der ESKOM"; VGB Kraftwerkstechnik, VGB Kraftwerkstechnik GmbH, Essen; vol. 70; No. 2; pp. 138-145; ISSN: 0372-5715; XP000161705; 1990; DE; Feb. 1, 1990.

Gallo W. L. R.; "A comparison between the hat cycle and other gas-turbine based cycles: efficiency, specific power and water consumption"; Energy Conversion and Management, Elsevier Science Publishers, Oxford; vol. 38; No. 15-17; pp. 1595-1604; ISSN: 0196-8904; DOI: 10.1016/S0196-8904(96)00220-8; XP004100992; 1997; GB; Oct. 11, 1997.

International Search Report for PCT Application No. PCT/EP2013/069095, dated Nov. 20, 2013; 10 pages.

* cited by examiner

METHOD FOR RECOVERING PROCESS WASTEWATER FROM A STEAM POWER PLANT

CROSS-REFERENCE TO RELATED APPLICATIONS

This application claims priority to PCT Application No. PCT/EP2013/069095 having a filing date of Sep. 16, 2013, based off of DE102012217717.5 having a filing date of Sep. 28, 2012, the entire contents of which are hereby incorporated by reference.

FIELD OF TECHNOLOGY

The following relates to a method for operating a steam power plant with a closed water-steam circuit and a reprocessing facility for process water and in particular the recovery of process water from wastewater from the water-steam circuit.

BACKGROUND

Steam power plants serve to generate electrical energy. They may take the form of thermal power plants, wherein the steam is generated using a fossil fuel-fired boiler. A thermal power plant substantially comprises in this case, in addition to the fired boiler, a steam turbine, a water-steam circuit and a condenser.

Steam power plants may likewise take the form of combined cycle gas turbine (CCGT) plants. Such combined cycle gas turbine plants in this case comprise at least one gas turbine, a water-steam circuit, a steam generator, a steam turbine, a generator and a condenser.

Steam power plants may also take the form of concentrated solar power (CSP) plants. Such thermal power plants in this case comprise at least the sun as heat producer, oil as transfer medium, a water-steam circuit, a steam generator, a steam turbine, a generator and a condenser.

The working medium used in steam power plants is deionized water, which is evaporated in the steam generator. The steam generated is passed into the steam turbine and expanded therein. The energy released on expansion is transferred via a shaft to the generator. The expanded steam is then fed to a condenser, and the liquid phase is condensed.

To assist the condensation process, an evacuation system is connected to the condenser, which system produces a vacuum in the condenser when the steam power plant is started up, and maintains it during operation. Steam turbine efficiency is increased by the vacuum and non-condensable gases are removed thereby from the liquid stream.

During the energy generation process various contaminants may be introduced into the working medium. In addition, various substances are added to the working medium for conditioning or purification. The working medium contaminated by contaminants or additives must be removed from the water-steam circuit as process wastewater, since the contaminants stand in the way of direct re-use as a working medium in the water-steam circuit.

Ammonia serves as an alkalizing agent for conditioning the feed water. Through the addition of ammonia, an increase in the pH value of the working medium may be achieved, whereby the relative corrosion rate of the feed water is reduced. Since the distribution coefficient of ammonia in liquids and steam is different, locally markedly elevated ammonia concentrations may occur in system parts involving evaporation and condensation processes (for example in the condenser, the evacuation system and the drum blowdown).

Process wastewaters arise at various points in the water-steam circuit. The process wastewater arising during production of the deionized water in a deionization plant is regeneration wastewater, which makes up the majority of contaminated process wastewater. On startup and shutdown, deficiencies (due to additional feeding of working medium) and excesses (due to discharge of working medium) of the working medium must be compensated. Moreover, process wastewaters arise due to continuous sampling and leaks in the water-steam circuit. As a result of the above-stated water losses, the water-steam circuit must be fed continuously with deionized water (DIW). Backwashing and regeneration processes in the deionization plant and condensate purification also result in process wastewater.

By way of example, a 400 MW combined cycle gas turbine plant produces annually around 14,000 tonnes of process wastewater in base-load operation in the case of steam generators with once-through boilers, and around 22,000 tonnes with circulating boilers. Hitherto, the majority of these process wastewaters has been discarded.

An exemplary 2×1050 MW fossil fuel-fired thermal power plant with a natural draft cooling tower and a wet limestone flue gas purification system produces as much as up to 100,000 tonnes of process wastewater per year in base-load operation, which has to be discharged into public water systems. Just about half of this amount is accounted for by the cooling tower.

Due to ever more stringent environmental legislation, and for countries suffering water shortages, reducing water consumption and thus reusing wastewaters and process waters within the water-steam circuit is becoming increasingly significant. In particular, the guidelines for discharging wastewaters into public water systems are becoming ever more stringent. The water consumption of a steam power plant should therefore be reduced as much as possible.

Contaminated process wastewaters arise for example in the steam drums of a combined cycle gas turbine plant. A plurality of steam drums at different pressure levels are conventionally provided. The combined cycle gas turbine plant may also comprise one or more "once-through" steam generators, which are also known as Benson boilers and which are in the main integrated into the high pressure stage. Because saturated steam is withdrawn from the steam drums, nonvolatile substances remain in the steam drums. These non-volatile contaminants are concentrated in the steam drums, and have therefore to be removed from the circuit by blowdown. Water is then lost from the circuit, which has to be compensated again by make-up water or "DIW".

EP 1 706 188 B1 describes a method for recovering at least some of the blowdown water from a steam power plant. To reduce energy and water losses, the blowdown water from the high-pressure steam drum is conveyed on into the lower-pressure steam drum and expanded ("boiler cascading blowdown"). A disadvantage here, however, is that all the contaminants are passed from one pressure level to the next. It is therefore proposed that the steam separated off during high-pressure water-steam separation is fed to a lower-pressure steam drum (advanced cascading blowdown). This allows good energy utilization and re-use of at least some of the steam in the water-steam circuit. The remaining blowdown water must, however, be disposed of completely.

Further process wastewaters arise through drainage. Drainage is performed for example during ongoing operation from pipes which have been closed for a relatively long period in which condensate has collected. To this end, the pipes are opened briefly and thus drained. Water is then lost from the water circuit, which has to be replaced by make-up water (DIW). Drainage also in particular arises to a greater extent on startup and shutdown of the steam power plant, since for example on shutdown of the thermal power plant the steam in the water circuit gradually condenses and the resultant liquid water must not be allowed to stand in the plant parts, in particular in the heating surfaces. On shutdown, more water is drained from the water circuit than is replenished, until in the end no more water is replenished.

EP 1 662 096 A1 and U.S. Pat. No. 7,487,604 B2 each describe a method which makes it possible to recover drainage water from the steam power plant. The drainage water may be collected and combined, and also in part stored temporarily in a tank. The stored drainage water is then discharged into the environment by way of a pump. The tank here serves to reduce the running time and the interval frequency of the pump. The drained water may also be expanded in a separation vessel, to separate water and steam from one another. The separated steam and the drained DIW is then output into the environment. It is therefore proposed to collect all the drained water from at least one pressure stage of the water-steam circuit and store it, and to return the drained water collected and stored in this way substantially completely back to the water circuit via a water treatment plant.

However, no method has hitherto been known from the prior art by which all the process wastewaters from a power plant can be collected and largely completely re-used in the water-steam circuit.

SUMMARY

An aspect relates to a method for operating a steam power plant in which the contamination of the environment with process wastewater and the consumption of freshwater is minimized to the effect that virtually no process wastewater is any longer output to the environment. Further aspects relate to minimizing the overheads of a steam power plant and of a power plant for generating electrical energy with such a steam power plant which arise due to the deionization plant (provision of DIW).

The method for operating a steam power plant comprises a water-steam circuit, in which all the process wastewaters arising are collected separately from the water-steam circuit in accordance with the respective degree of contamination in a number of wastewater sub-volumes. At least one first wastewater sub-volume with a first degree of contamination and at least one second wastewater sub-volume with a second degree of contamination are collected separately. The second degree of contamination of the second wastewater sub-volume is higher than the first degree of contamination of the first wastewater sub-volume. The first wastewater sub-volume and the second wastewater sub-volume are then mixed together such that a process wastewater arises which has a largely constant degree of contamination. This process wastewater is fed to a wastewater treatment plant.

The wastewater treatment plant comprises an evaporator for evaporating the wastewater. Various technologies are available for evaporating wastewater. Theoretically, all dissolved constituents are removed from the wastewater by evaporation and crystallization. These constituents may then be disposed of as a solid. The distillate is of high purity and may be re-used in the steam power plant. The distillate is introduced into the raw water tank. Even heavily contaminated wastewaters are treated completely by evaporation. The raw water requirement and the wastewater volume of the steam power plant are thus reduced.

An embodiment of the invention is thus based on the consideration that all the process wastewaters of the steam power plant are supplied to a wastewater treatment plant, the process wastewaters being separated and collected in such a way, prior to introduction into the wastewater treatment plant, that at least two wastewater sub-volumes with different degrees of contamination are formed. This makes it possible for all the process wastewaters from the thermal power plant to be recovered.

According to embodiments of the invention, provision is made in this respect for a further wastewater sub-volume with clean process wastewaters to be collected, in addition to the at least two wastewater sub-volumes with contaminated wastewaters. Clean process wastewaters are considered to be water which has no contamination, or only a small, allowable degree of contamination. Clean process wastewaters are for example specific water sub-streams which were removed from the water-steam circuit for measurement but were not degraded by the measurement. Drainage water may likewise be considered clean process wastewaters. The conditioning agent ammonia is not considered a contaminant at this point.

The further wastewater sub-volume with clean process wastewaters is only slightly contaminated (for example with iron particles and ammonia). Before recirculation into the water-steam circuit, these process wastewaters must therefore be purified using the condensate purification plant.

The recirculated process wastewaters must under certain circumstances firstly be cooled. The service life of the condensate purification plant is reduced by the higher ion loading. The volume of DIW which has to be provided by the deionization plant is lower, since less make-up water is necessary. In the case of a circulating boiler, the clean and purified process wastewaters are passed directly into the tank for demineralized water. In the case of a once-through boiler, the wastewaters are passed via the existing condensate purification plant into the water-steam circuit.

As a result of lower water usage or optimized water treatment, the consumption of chemicals may also be lowered, whereby the environmental balance of the power plant may be made more resource-efficient.

By recirculating the condensate arising in the wastewater treatment plant by evaporation into the deionization plant, up to 75,200 tonnes per year less DIW have to be treated by the deionization plant in the thermal power plant mentioned by way of example. Around 15,000 tonnes per year of this is accounted for by the recoverable process wastewaters from boiler flushing and startup, around 4,300 tonnes per year by recoverable blowdowns from the auxiliary boiler, up to 6,000 tonnes per year by process wastewater from sampling and around 50,000 tonnes per year by condenser recovery.

In a preferred further development of the method according to embodiments of the invention, the process wastewater purified by the wastewater treatment plant is largely completely recirculated into the water-steam circuit. Recirculation proceeds preferably via the demineralization plant. By recirculating the purified process wastewaters into the water-steam circuit, a closed circuit is formed. This allows operation of the steam power plant without raw water being continuously supplied from the environment, or process wastewater having to be discharged into the environment. The steam power plant according to embodiments of the invention is thus suitable in particular for regions suffering water shortages, or regions in which the impact on nature must be minimized for reasons of environmental protection.

The second wastewater sub-volume is particularly advantageously formed in that a process wastewater is fed thereto which is taken from a demineralization plant/deionization plant comprised by the steam power plant. These plants for providing demineralized water produce a process wastewater which is relatively heavily contaminated. In addition, process wastewater from the condensate purification plant may also be fed into the second water sub-volume. The second wastewater sub-volume is fed to a separate collecting tank and collected and intermediately stored therein.

Process wastewater is preferably fed to the first wastewater sub-volume which has been taken from an evacuation system comprised by the steam power plant and results from continuous sampling from the water-steam circuit. The process wastewaters from the evacuation system and from sampling are relatively lightly contaminated, but do contain ammonia. The first wastewater sub-volume is also fed to a separate collecting tank and collected and intermediately stored therein. In addition to ammonia, said sub-volume also contains other anions and cations.

The wastewater treatment plant may be particularly efficiently operated if the first wastewater sub-volume and the second wastewater sub-volume are mixed with one another in such a way that a combined process wastewater with a largely constant degree of contamination can be fed to the wastewater treatment plant. The mixing ratio is adjusted using a closed-loop control device. Due to the constant degree of contamination, the wastewater treatment plant is uniformly loaded, and may be operated at a largely constant level. The wastewater treatment plant comprises an evaporator, which is operated with a uniform degree of contamination.

The degree of contamination of the first wastewater sub-volume and the second wastewater sub-volume is preferably in each case determined by measurement of conductivity. These measurements may proceed continuously. The measurement results may then be evaluated in real time by the closed-loop control device and used to control the mixing ratio.

The wastewater treatment plant preferably comprises an evaporator, to which, in addition to the combined process wastewater, an additive is supplied, such that a solid, for example ammonium sulfate, is precipitated. These solids may be re-used in the fertilizer industry.

In a further advantageous embodiment of the invention, the steam power plant further comprises a steam generator, which takes the form of a once-through boiler. A condensate purification device is arranged downstream of the once-through boiler. The condensate purification device provides a process wastewater which is relatively heavily contaminated and is therefore preferably fed to the first wastewater sub-volume.

BRIEF DESCRIPTION

Figure 2:
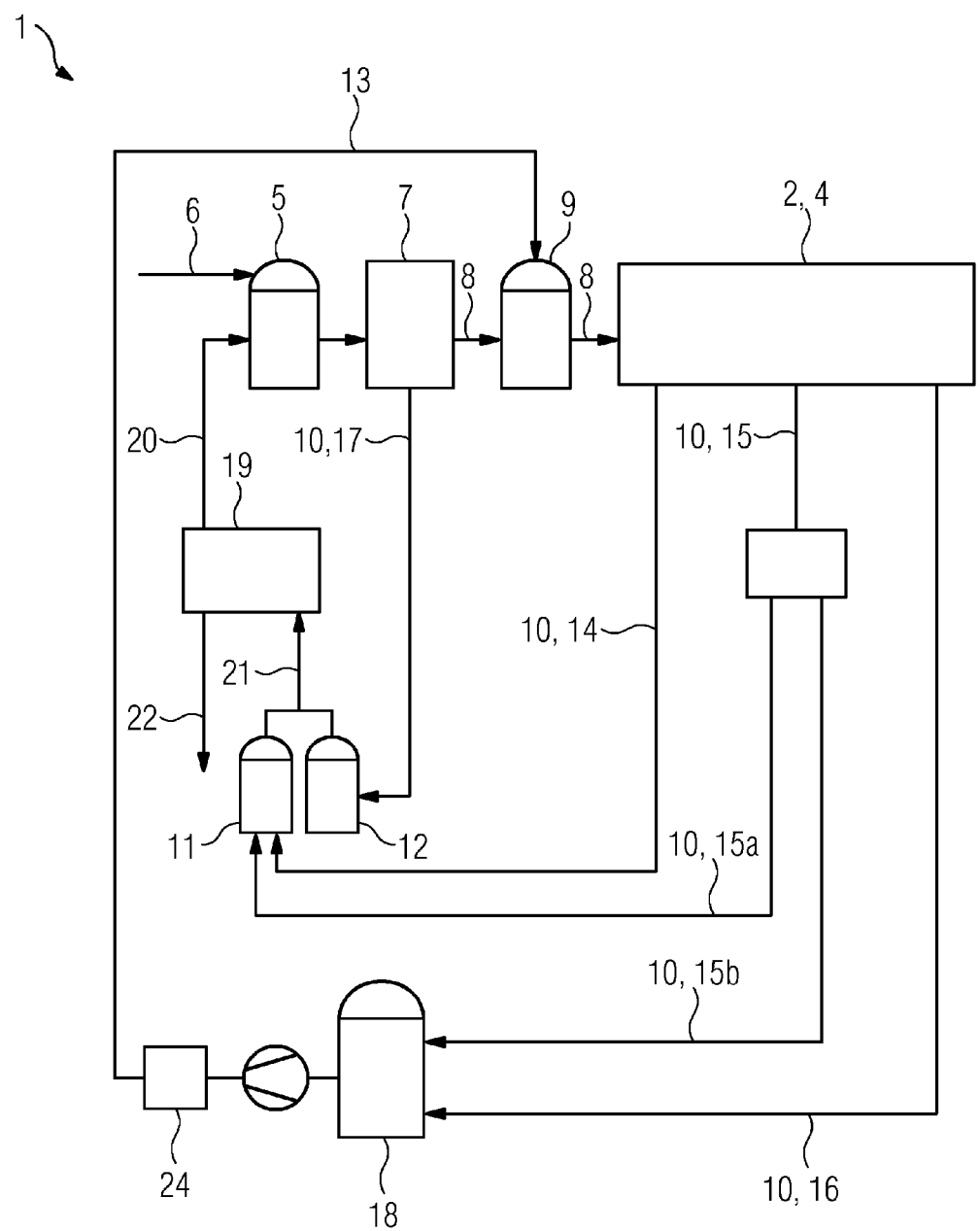

Some of the embodiments will be described in detail, with reference to the following figures, wherein like designations denote like members, wherein:

FIG. 1 shows a diagram of an embodiment of a method for operating a steam power plant with a once-through boiler; and FIG. 2 shows a diagram of an embodiment of a method for operating a steam power plant with a circulating boiler.

DETAILED DESCRIPTION

FIG. 1 shows a steam power plant 1 with a water-steam circuit 2. The water-steam circuit 2 is shown only diagrammatically here. The water-steam circuit 2 comprises a once-through boiler 3 not shown in any greater detail here, in which steam is generated, a steam turbine and a condenser. For startup and shutdown of the steam power plant 1, the condenser additionally comprises an evacuation system, by which a vacuum can be established.

The steam power plant 1 further comprises a raw water tank 5, which is supplied with water from a fresh water source via a raw water line 6. Continuous replenishing with water is necessary, since water is continuously being lost from the system through leaks.

The raw water tank 5 is connected to a demineralization plant 7 (deionization plant) via a line. The demineralization plant 7 comprises ion exchangers (ion exchange resins), by which the raw water from the raw water tank 5 is deionized, resulting in demineralized water 8. In addition to the demineralized water 8, a process wastewater 10 arises in the form of regeneration wastewater 17. The demineralized water 8 is intermediately stored in a tank 9 and then transferred into the water-steam circuit 2.

In the water-steam circuit 2, the demineralized water 8 is evaporated in the once-through boiler, expanded in the steam turbine, and re-condensed in the condenser with the assistance of the evacuation system.

Process wastewaters 15 are continuously removed from the water-steam circuit 2 in the form of samples. Measurements result in formation of a contaminated process wastewater 15a and a clean process wastewater 15b. Overall, clean and contaminated process wastewaters 10 leave the water-steam circuit 2.

The contaminated process wastewaters 10 include the process wastewaters 14 from the evacuation system and the contaminated process wastewaters 15a from sampling.

The process wastewater 15b from sampling is a clean process wastewater and is conveyed with process wastewater 10 into a collection tank 18 for clean process wastewaters, and forms a wastewater sub-volume with clean process wastewaters 13. This wastewater sub-volume with clean process wastewaters 13 is recirculated into the water-steam circuit via a condensate purification plant 24.

The process wastewater 14 from the evacuation system is relatively heavily contaminated, as is the process wastewater 15a from contaminated sampling. The process wastewaters 14 and 15a are combined in a first collecting tank and form a first water sub-volume 11. The process wastewater 17 from the demineralization plant 7 and the regeneration wastewater 16 from the condensate purification device 24 are fed to a second collecting tank and form a second water sub-volume 12.

The process wastewaters from the first water sub-volume 11 and the second water sub-volume 12 are then discharged and mixed together, resulting in a combined process wastewater 21, which is supplied to a wastewater treatment plant 19. The mixing ratio is continuously adapted when the steam power plant is in operation. The objective of adaptation is that, even with fluctuating degrees of contamination of the first water sub-volume 11 and/or the second water sub-volume 12, by adapting the mixing ratio a combined process wastewater 21 is achieved, the degree of contamination of which is largely constant. The wastewater treatment plant 19 may thereby be operated constantly. The degree of contamination of the water sub-volumes is determined by conductivity measurements.

The wastewater treatment plant 19 comprises an evaporator, in which the combined process wastewater 21 is evaporated. Through condensation of the steam, a purified process wastewater 20 is then formed, which is discharged again into the raw water tank 5, and thus is also made available again to the water-steam circuit. As a result of the condensation of purified process wastewater 20, a solid residue 22 arises in the wastewater treatment plant 19 which substantially comprises ammonium sulfate. This is discharged and may be put to further use.

The wastewater sub-volume 12 consists, in the case of a circulating boiler, merely of the regeneration wastewater 17 of the demineralization plant 7.

FIG. 2 shows the steam power plant of FIG. 1, except that the water-steam circuit 2 comprises not a once-through boiler, but rather a circulating boiler 4, shown here only schematically. The steam power plant 1 of FIG. 2 further comprises a condensate purification device 24.

In the case of the once-through boiler 3, condensate 23 is fed to a condensate purification device 24.

The process wastewaters 17 from the demineralization plant 7 and the regeneration wastewaters from the condensate purification device 24 are passed into the second collecting tank and form the second water sub-volume 12.

The clean wastewater sub-volume 13 is purified via the condensate purification device 24 and recirculated into the water-steam circuit 2.

Embodiments of the invention make it possible to minimize the volumes of wastewater which are output into the environment. In this way, less fresh water has to be additionally supplied to the steam power plant, whereby less working medium also has to be treated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating a steam power plant with a water-steam circuit, in which all process wastewaters arising are collected separately from the water-steam circuit in accordance with a respective degree of contamination thereof in a number of wastewater sub-volumes, wherein at least a first wastewater sub-volume with a first degree of contamination and at least a second wastewater sub-volume with a second degree of contamination are formed, wherein the second degree of contamination is higher than the first degree of contamination, further wherein the first wastewater sub-volume and the second wastewater sub-volume are mixed together in such a way that a combined process wastewater with a largely constant degree of contamination arises, which is fed to a wastewater treatment plant and in that the process wastewater purified in the wastewater treatment plant is largely completely recirculated into the water-steam circuit.

2. The method as claimed in claim 1, wherein a process wastewater is fed to the second wastewater sub-volume which is taken from a deionization plant comprised by the steam power plant.

3. The method as claimed claim 1, wherein a process wastewater is fed to the first wastewater sub-volume which is taken from an evacuation system comprised by the water-steam circuit and originates from a water sample taken from the water-steam circuit.

4. The method as claimed in claim 1, wherein the degree of contamination of the first wastewater sub-volume and the second wastewater sub-volume is determined in each case by measuring conductivity.

5. The method as claimed in claim 1, wherein the wastewater treatment plant comprises an evaporator, which is designed for largely continuous operation.

6. The method as claimed in claim 1, wherein an additional wastewater sub-volume with clean process wastewaters is separately collected which is taken from a condenser comprised by the water-steam circuit and/or originates from a water sample taken from the water-steam circuit.

7. The method as claimed claim 1, wherein the steam power plant comprises a steam generator, which takes the form of a once-through boiler, wherein a process wastewater is fed to the second wastewater sub-volume which is taken from a condensate purification device comprised by the once-through boiler.

8. The method as claimed in claim 1, wherein the steam power plant comprises a steam generator, which takes the form of a circulating boiler.

\* \* \* \* \*

UNITED STATES PATENT AND TRADEMARK OFFICE
CERTIFICATE OF CORRECTION

PATENT NO. : 9,962,664 B2  
APPLICATION NO. : 14/430680  
DATED : May 8, 2018  
INVENTOR(S) : Amslinger et al.

Page 1 of 1

It is certified that error appears in the above-identified patent and that said Letters Patent is hereby corrected as shown below:

In the Claims

Column 8, Line 17, Claim 3 delete "claimed claim" and insert --claimed in claim--

Column 8, Line 34, Claim 7 delete "claimed claim" and insert --claimed in claim--

Signed and Sealed this  
Tenth Day of July, 2018

Andrei Iancu  
*Director of the United States Patent and Trademark Office*